United States Patent [19]
Degobert et al.

[11] 3,912,635
[45] Oct. 14, 1975

[54] DEVICE FOR RECOVERING POLLUTING PRODUCTS SPREAD OVER THE WATER SURFACE, IN PARTICULAR OIL PRODUCTS

[75] Inventors: Paul Degobert; Francois Kermarrec, both of Rueil-Malmaison; Yvon Nadaud, Saint-Ouen, all of France

[73] Assignee: Institut Francais du Petrole, des Carburants et Lubrifiants, France

[22] Filed: Aug. 24, 1973

[21] Appl. No.: 391,520

[30] Foreign Application Priority Data
Sept. 18, 1972 France .............................. 72.33068

[52] U.S. Cl. ........................... 210/242; 210/DIG. 21
[51] Int. Cl.² ......................................... E02B 15/04
[58] Field of Search ........................ 210/23, 39–42, 210/73, 242, 83, 490, 491, 495, 513, DIG. 5, DIG. 21, 232–238

[56] References Cited
UNITED STATES PATENTS

| | | |
|---|---|---|
| 1,518,160 | 12/1924 | O'Hara ........................... 210/235 X |
| 2,788,125 | 4/1957 | Webb ............................... 210/23 X |
| 3,352,778 | 11/1967 | Brinks, Jr. et al. .................... 210/23 |
| 3,450,632 | 6/1969 | Olson et al. ....................... 210/73 X |
| 3,517,820 | 6/1970 | Mintz ................................ 210/491 |
| 3,627,677 | 12/1971 | Dyrud ................................. 210/23 |
| 3,628,665 | 12/1971 | Bakker ........................ 210/DIG. 21 |
| 3,702,657 | 11/1972 | Cunningham et al. ............... 210/242 |
| 3,722,686 | 3/1973 | Arnett et al. ........................ 210/242 |
| 3,726,406 | 4/1973 | Damberger ........................ 210/242 |
| 3,779,908 | 12/1973 | Gregory ............................... 210/23 |

*Primary Examiner*—Theodore A. Granger
*Attorney, Agent, or Firm*—Craig & Antonelli

[57] ABSTRACT

A device for recovering polluting liquids spread over the water surface, comprising at least one floatable container having a porous hydrophobic wall which is easily wettable by these polluting liquids. The container includes a recess limited by an impervious wall, in combination with means for transferring into this recess the polluting liquids which have selectively traversed the porous wall.

14 Claims, 8 Drawing Figures

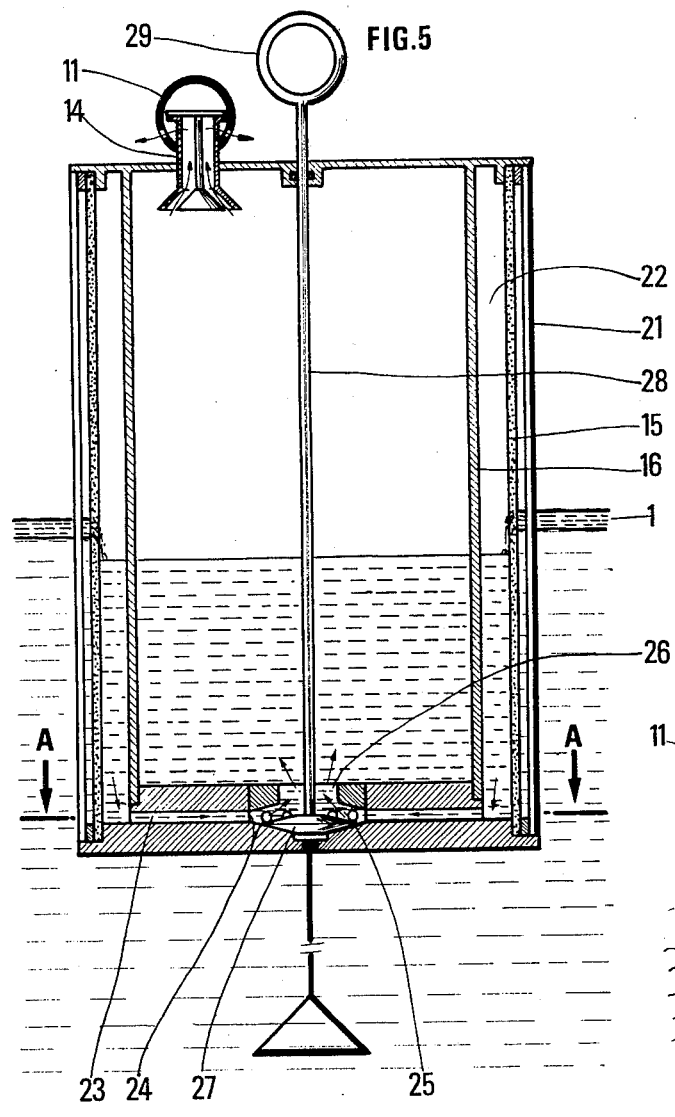
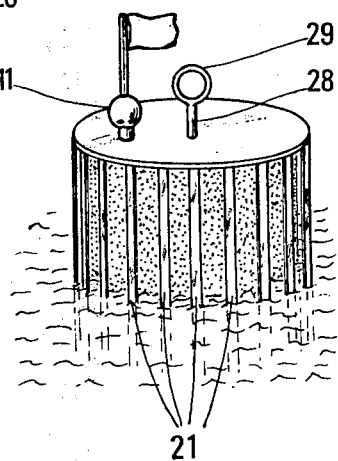
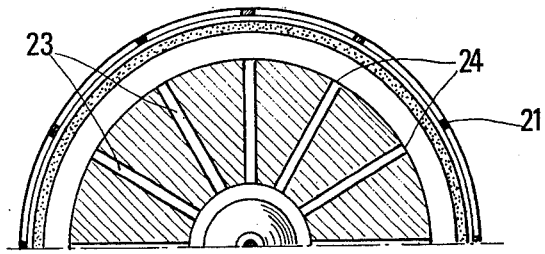

DEVICE FOR RECOVERING POLLUTING PRODUCTS SPREAD OVER THE WATER SURFACE, IN PARTICULAR OIL PRODUCTS

The present invention relates to a device for recovering polluting products spread over the water surface, in particular oil products forming a slick on the water surface.

This device is adapted to recover polluting products of a lower density than water and which are immiscible therewith, by creating at the water surface at least a recess for collecting these polluting products, this recess being defined by at least one wall at least a portion of which is porous, said wall portion being made of a hydrophobic material easily wetted by the polluting products, through which these products selectively penetrate into said recess and which forms a barrier against water.

Such a process may be performed by using containers of which at least one wall portion is porous, this porous portion being hydrophobic and easily wettable by the polluting products.

However, except when using containers with adjustable ballasting means, adapted to maintain the same porous portion of the container at the level of the slick of polluting products which floats on the water surface until this container is completely filled up with polluting products, it is necessary to give the porous portion of the wall the greatest possible height, so that the container, which sinks progressively into the water, as it becomes more filled, can gather a sufficient quantity of the polluting products.

The problem then arises of preventing that the collected polluting products escape from the container, by oozing through the porous portion of the container wall, when the container is raised from the water.

This problem is solved by using the device of the invention whereof non limitative embodiments are illustrated by the accompanying drawings, in which:

FIG. 1 illustrates a first embodiment of the invention, comprising an immersed porous wall portion surmounted by a non porous portion, FIG. 2 shows a second embodiment, wherein the container wall is porous over its whole height, but is internally provided with a non-porous wall at some distance from the external porous wall, this non porous wall having apertures at the bottom of the container, FIGS. 3 and 4 illustrate modifications of the embodiments according to FIGS. 1 and 2, wherein the containers automatically turn over when they have been filled up to a fixed level, FIG. 5 illustrates another embodiment of the container illustrated by FIG. 2, which can be recovered without turning it over, FIG. 5A is a partial cross-sectional view of the container of FIG. 5, taken along line A—A, FIG. 6 is a perspective view, on a reduced scale, of the container of FIG. 5, FIG. 7 illustrates a plurality of containers according to the invention interconnected through cables.

The same references have been used in the different drawings to designate similar elements.

In the embodiment illustrated by FIG. 1, the container used for recovering polluting products forming a slick 1 on the water surface comprises a capacity 2 with an impervious wall, located above a capacity 3 having a porous wall which is hydrophobic and easily wettable by the polluting liquid (oleophilic material if the polluting liquid is an oily liquid, such as an oil product).

These two capacities are connected at 4.

The bottom 5 of the capacity 3 is impervious.

The assembly is provided with ballasting means 6 supported through a cable 7 from a ring 8 secured to the bottom of the capacity 3 and floats at the water surface.

The polluting liquid selectively penetrates into the capacity 3 through the porous lateral wall thereof and gathers at 9. As this capacity is being filled, the air within the container can escape through tube 10 (arrows), overtopped by a protecting bell-shaped element 11.

The container is provided with shock absorbing means 12, capable of withstanding shocks between containers of the same type floating on the water surface.

The container sinks progressively as the capacity 3 is being filled with polluting liquid.

This filling is stopped when, upon sinking of the container, the lower edge of the capacity 2 with an impervious wall reaches the water surface.

At this time the polluting liquid in the capacity 3 reaches the level of the lower opening of tube 10.

The container is collected by turning it over, so that the polluting liquid contained in the capacity 3 with a porous wall passes into the capacity 2 with an impervious wall whose volume has been selected at least equal to that of the capacity 3. A not-illustrated valve, associated with the vent 11, prevents any ingress of water in this position.

Under these conditions, the polluting liquid can no longer escape from the container when the latter is raised from the water surface, since this liquid is now housed in a capacity having an impervious wall.

The turning over or inverting of the container is facilitated if a cable 13 connects to one another the rings 8 of a plurality of such recovering containers which float on the water surface, since it is then sufficient to exert a pull on the cable 13, as is done with a fishing-line, to cause the turning over of the various containers.

The embodiment of FIG. 2 also makes use of a container which can be turned over and is provided with a vent 14 at its upper part, but whose side wall 15 is porous (hydrophobic and easily wettable by the polluting products) over its whole height.

At some distance of this wall there is internally provided a tight wall 16 having apertures 17 in the vicinity of the bottom 5, so that the polluting liquid can flow into the interior of the container.

This embodiment offers the advantage that substantially the whole internal volume of the container can be used for recovering the polluting liquid, without any risk that this liquid might escape from the container when the latter is turned over.

FIG. 3 illustrates a modification of the embodiment of FIG. 1, wherein the container automatically turns over when the capacity 3 provided with a porous wall is completely filled up with the polluting liquid.

In this embodiment a cable 7 supports the ballasting means 6, through a vertical shaft which traverses the capacity 3, from a fastening point 19 which is constituted by a piece of a material soluble in the polluting product which will fill the capacity 3, or of a material which can be destroyed or disaggregated by this polluting liquid. This fastening point is located at the maximum level to be reached by the polluting liquid in the capacity 3.

By way of non-limitative example, the soluble material may be paraffin, if the polluting product is an oil product.

Alternatively, the upper end of cable 7 may be secured at 19 to any suitable device, for example provided with a float, which will be released by an upward displacement of the float when the level of polluting liquid in the capacity 3 reaches the level of the point 19.

At this moment the ballast 6 which is also connected, but in a loosely way through cable 20, to the upper part of the container, being no longer suspended at 19 through cable 7, causes the container to tilt or turn over, by applying a sudden tension to cable 20.

FIGS. 5, 5A and 6 illustrate another modification of the embodiment according to FIG. 2.

Figure 1:
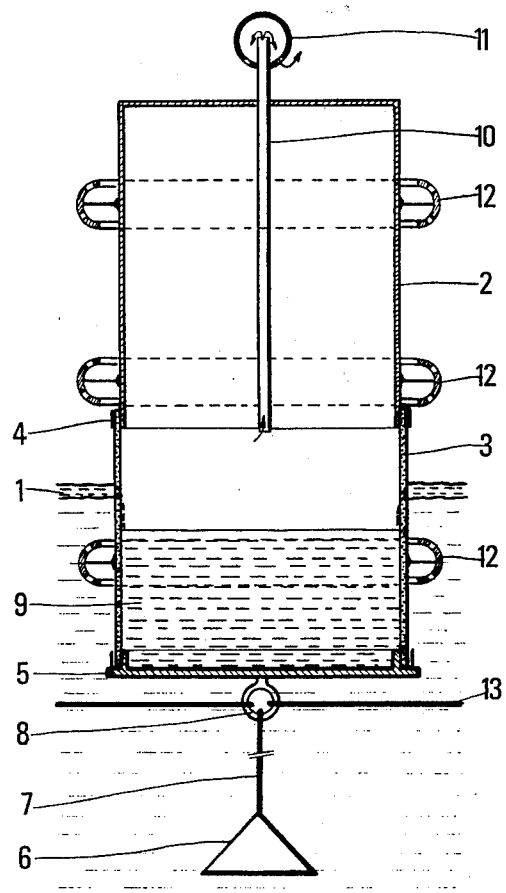
Figure 2:
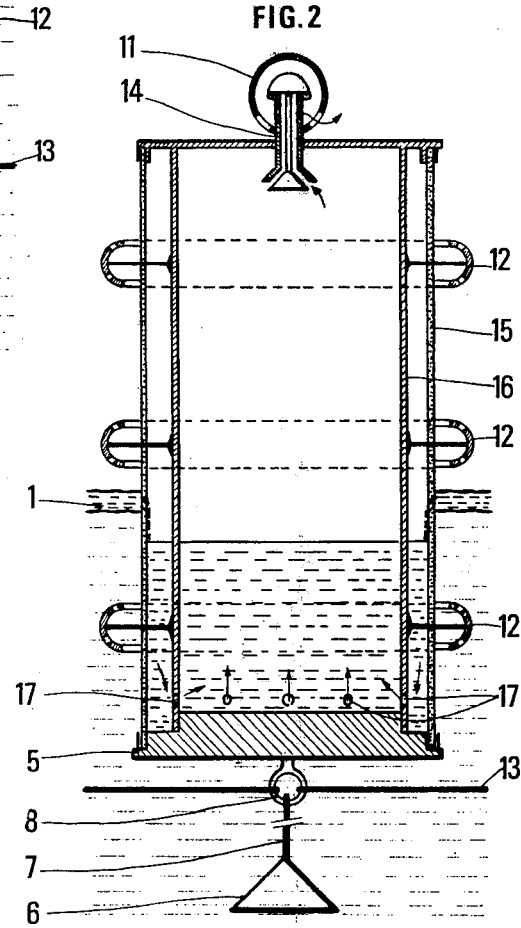
Figure 3:
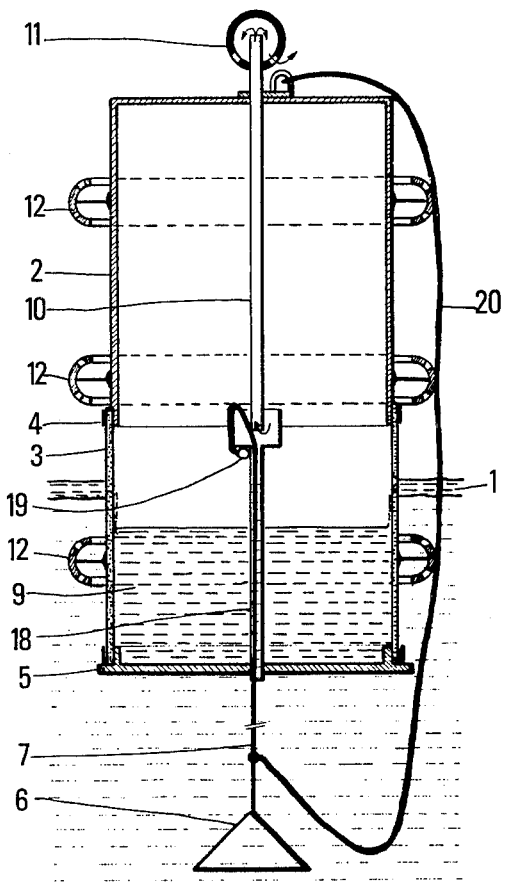
Figure 4:
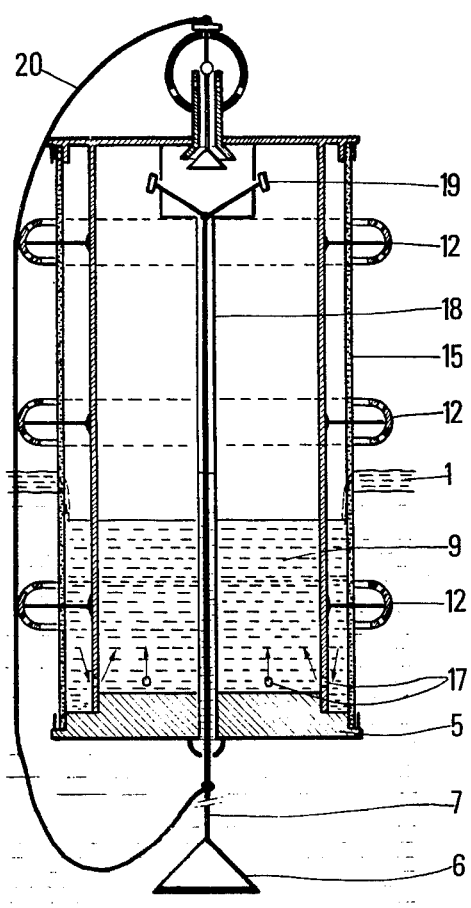
FIG. 4 illustrates a similar modification of the embodiment according to FIG. 2 and the same reference numbers have been used in FIGS. 3 and 4 to designate similar elements.

In this embodiment, instead of the circular shock absorbers 13, there have been provided protecting rods 21 (FIGS. 5 and 6) arranged along generatrices of the cylindrical container, and it is no longer necessary to turn over this container to prevent the polluting liquid which has filled this container to escape therefrom when the container has been raised from the water surface.

To this end the annular space 22 between the porous wall 15 and the impervious wall 16 communicates at its lower part with the interior of the container through channels 23 opening through orifices 24 in an inlet chamber 25 for the polluting liquid flowing into the container, this chamber opening into the container through an orifice 26 which can be obturated through a valve 27.

The orifice 26 is obturated by applying a tractive force on a rod 28 which is provided with a gripping ring 29 at its upper end.

Under these conditions, a pull applied to the ring 29 during the raising of the container confines the polluting liquid inside the impervious wall 16, by obturating the orifice 26 through lifting of the valve 27.

Figure 7:
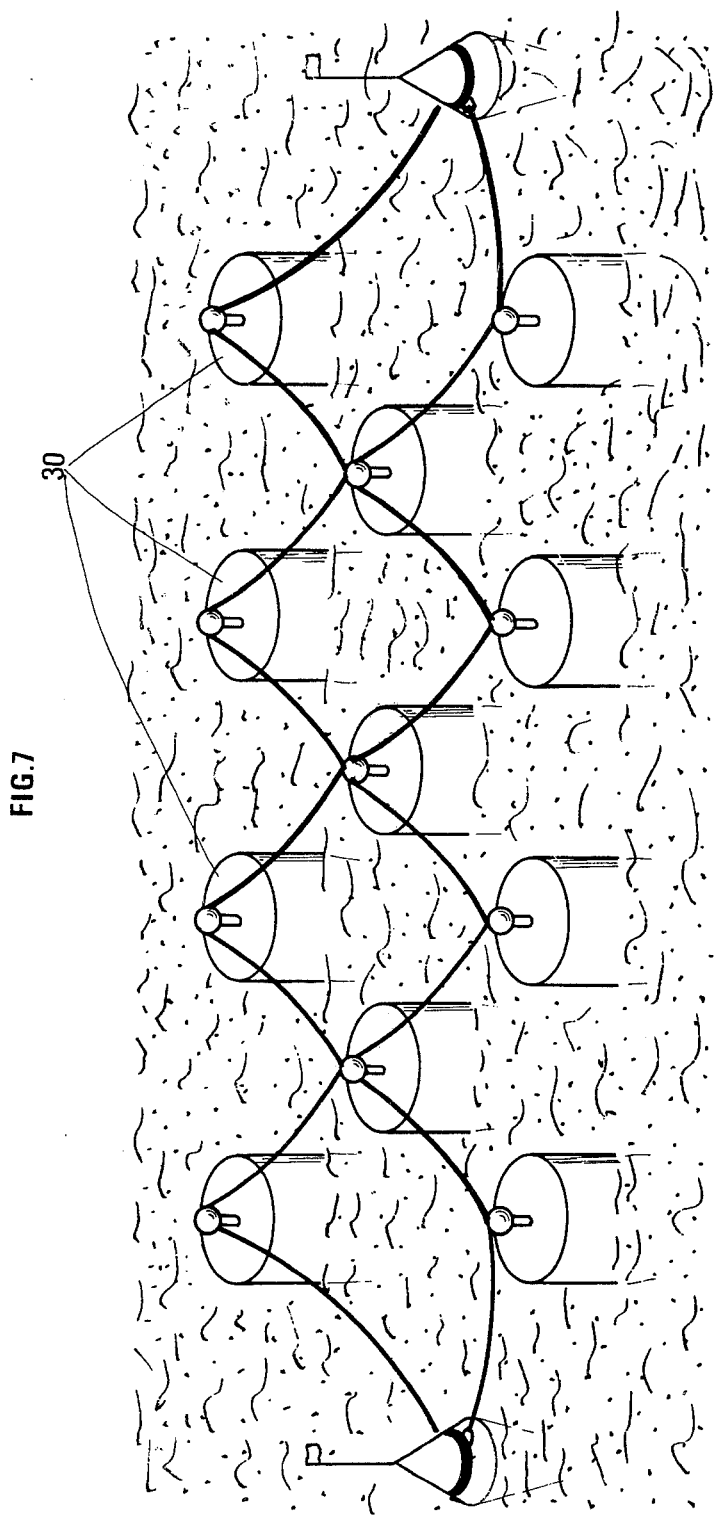

It will be advantageous to make use of a plurality of containers according to the invention connected to one another, for example through cables 30 (FIG. 7), so as to facilitate their releasing from and recovering into a ship, a plane or a helicopter.

Moreover when crude oil or rather viscous oil products spread over the water surface must be recovered, it will be possible to provide the porous hydrophobic-oleophilic wall according to the invention with heating means, for reducing the viscosity of such oil or oil products at the contact of the porous wall, thereby facilitating the passage of these products into the container.

These heating means may, for instance, consist of electrical heating resistors embedded in the porous wall of the container, or of focalizing infra-red radiations on the contact line of these products with the porous wall of the container.

What we claim is:

1. A device for recovering polluting liquid spread upon the surface of a body of water, said device comprising a floatable container with one end spaced from another end, a side wall arranged between said ends, said side wall being constructed of an impervious material adjacent to said one end and constructed of a porous hydrophobic material which is easily wettable by the polluting liquid adjacent to said other end, and means for transferring polluting liquid which has passed into said container through the porous material of said side wall to an end portion of the container adjacent said one end whereby said container is inverted to allow polluting liquid at said other end to flow to said one end.

2. A device according to claim 1, further comprising vent means extending into said container through the one end of said container for venting air from said container during entry of said polluting liquid.

3. A device according to claim 1, wherein said side wall of said container is formed of two cylindrical walls, one cylindrical wall being constructed of said impervious material and the other of said cylindrical walls being formed of said porous hydrophobic material, a recess within said container adjacent to said one end delimited by said one cylindrical wall for retaining polluting liquid within said container, said one cylindrical wall having substantially the same diameter as said other cylindrical wall, and said recess having a top portion and a bottom portion, the top portion of said recess being closed by the one end of said container and the bottom portion of said recess being in open communication with a space delimited by said other wall.

4. A device according to claim 1 wherein said side wall of said container is formed of two cylindrical walls, one cylindrical wall being constructed of said impervious material and the other of said two cylindrical walls being constructed of said porous hydrophobic material, said other cylindrical wall having a diameter greater than the diameter of said one cylindrical wall.

5. A device according to claim 1, wherein said side wall of said container is provided by two wall portions, one wall portion being constructed of said impervious material and the other wall portion being constructed of said porous hydrophobic material, a recess delimited by said one wall portion located at the end portion of said container for retaining the polluting liquid recovered by said device, said recess having a top portion and a bottom portion, the bottom portion of said recess being closed by one end of the container and the bottom portion of said recess being in open communication with a space delimited by said other wall portion, and said means for transferring the polluting liquid including means located at the other end of said container for inverting said container whereby said one end is positioned below the surface of the body of water and the other end is positioned above the surface of the body of water.

6. A device according to claim 5, wherein said means for inverting the container includes tilting cable means fastened at the other end of said container.

7. A device according to claim 6, wherein said tilting cable means connects a plurality of similar containers to one another.

8. A device according to claim 1, comprising a plurality of containers which are interconnected so as to facilitate the release and recovery thereof.

9. A device according to claim 1 wherein said porous material is provided with heating means for locally reducing the viscosity of the polluting liquids to be recovered.

10. A device for recovering polluting liquids spread over a water surface, said liquids having a smaller liquid gravity than water, which comprises at least one floatable container with an upper end adapted to be positioned above the water surface and a lower end adapted to be positioned below the water surface, said container having a porous hydrophobic wall which is easily wettable by the polluting liquids, a recess within said container delimited by an impervious wall, said porous hydrophobic wall being an external wall and said impervious wall being an internal wall spaced therefrom, and means for transferring polluting liquids which have selectively entered said container through said external porous wall into said recess delimited by said internal impervious wall said transferring means comprising at least one orifice for the passage of the polluting liquids arranged through said impervious wall substantially at a portion of said recess located adjacent to the lower end of said container.

11. The device according to claim 10, wherein a tilting cable means for turning over the container is fastened at the lower end of said container.

12. A device for recovering polluting liquids spread over a water surface, said liquids having a smaller specific gravity than water, which comprises at least one floatable container with an upper end adapted to be positioned above the water surface and a lower end adapted to be positioned below the water surface, said container having a porous hydrophobic wall which is easily wettable by the polluting liquids, a recess delimited by an impervious wall, and means for transferring the polluting liquids which have selectively passed through said porous wall into said recess within said container, said means for transferring the polluting liquids into said recess including tilting cable means secured to one end of said container, and ballasting means suspended from said container via a first cable, said first cable being slidably mounted along a longitudinal axis of the container and extending into the recess delimited by said impervious wall to be secured to an element fixed within said container, said element being automatically released from said container when polluting liquids in the container reach the level of said element, said tilting cable means including a second cable connecting said ballasting means to the upper end of said container whereby said ballasting means provides for an automatic tilting and turning over of the container by the effect of a sudden force applied to said tilting cable means as a result of the release of said element.

13. A device according to claim 12, wherein said element is made of a material which is soluble in or disaggregated by the polluting liquids.

14. A device for recovering polluting liquids spread over a water surface, said liquids having a smaller specific gravity than water, which comprises at least one floatable container with an upper end adapted to be positioned above the water surface and a lower end adapted to be positioned below the water surface, said container having an external porous hydrophobic wall which is easily wettable by the polluting liquids and which extends over a substantial height of said container from the lower end of said container, a recess delimited by an impervious wall located within said container spaced from said porous wall, and means for transferring the polluting liquids which have selectively passed through said porous wall into said recess, said means for transferring said polluting liquids comprising at least one orifice for the passage of the polluting liquids arranged through said impervious wall adjacent to the lower end of said container and means for closing said orifice, said means for closing said orifice including means for gripping the upper end of said container and valve means for said orifice operatively connected to said gripping means whereby the action of a force applied to said gripping means when lifting said container effects closure of said orifice.

* * * * *